United States Patent
Koyama

(10) Patent No.: US 12,274,939 B2
(45) Date of Patent: Apr. 15, 2025

(54) PROGRAM, GAME-VIRTUAL-SPACE PROVIDING METHOD, AND GAME-VIRTUAL-SPACE PROVIDING DEVICE

(71) Applicant: CYGAMES, INC., Tokyo (JP)

(72) Inventor: Masahiko Koyama, Tokyo (JP)

(73) Assignee: CYGAMES, INC., Tokyo (JP)

( * ) Notice: Subject to any disclaimer, the term of this patent is extended or adjusted under 35 U.S.C. 154(b) by 413 days.

(21) Appl. No.: 17/661,452

(22) Filed: Apr. 29, 2022

(65) Prior Publication Data

US 2022/0258047 A1    Aug. 18, 2022

Related U.S. Application Data

(63) Continuation of application No. PCT/JP2020/040401, filed on Oct. 28, 2020.

(30) Foreign Application Priority Data

Oct. 31, 2019   (JP) .................. 2019-198341

(51) Int. Cl.
*A63F 13/52* (2014.01)
*A63F 13/57* (2014.01)
*G06T 19/00* (2011.01)

(52) U.S. Cl.
CPC .............. *A63F 13/52* (2014.09); *A63F 13/57* (2014.09); *G06T 19/00* (2013.01)

(58) Field of Classification Search
CPC ........... A63F 13/52; A63F 13/57; G06T 19/00
See application file for complete search history.

(56) References Cited

U.S. PATENT DOCUMENTS 6,320,582 B1 * 11/2001  Yamamoto .............. G06T 15/20
                                                                        345/473
6,326,963 B1 * 12/2001  Meehan .................. G06T 19/00
                                                                        345/473

(Continued)

FOREIGN PATENT DOCUMENTS

JP          2000-342854 A       12/2000

OTHER PUBLICATIONS

Vector and Polar Coordinates. Gamedev.net. Posted Feb. 2, 2005. Accessed Sep. 7, 2024. <https://www.gamedev.net/forums/topic/298486-vector-and-polar-coordinates/> (Year: 2005).*

(Continued)

*Primary Examiner* — William H McCulloch, Jr.
(74) *Attorney, Agent, or Firm* — Osha Bergman Watanabe & Burton LLP

(57) ABSTRACT

A computer that provides a game virtual space in which a game object is placed in a predetermined plane is caused to function as: a generation unit that generates the game virtual space, which is a spherical coordinate space; an acquisition unit that acquires information related to a cartesian coordinate system including the position of a target to be displayed in the game virtual space; a conversion unit that converts the cartesian coordinate system into a polar coordinate system on the basis of the information; and a display control unit that displays the target at a position in the game virtual space corresponding to the position in the cartesian coordinate system on the basis of information related to the polar coordinate system. The display control unit controls a display form of the target in the game virtual space on the basis of a predetermined condition.

8 Claims, 12 Drawing Sheets

(56) References Cited

U.S. PATENT DOCUMENTS

| | | | |
|---|---|---|---|
| 6,409,604 B1* | 6/2002 | Matsuno | A63F 13/833 463/31 |
| 7,336,299 B2* | 2/2008 | Kostrzewski | G06T 5/80 348/207.99 |
| 7,889,209 B2* | 2/2011 | Berger | G09G 5/00 715/848 |
| 7,909,696 B2* | 3/2011 | Beaulieu | G06F 17/00 463/19 |
| 8,537,113 B2* | 9/2013 | Weising | G06F 3/012 715/810 |
| 8,659,658 B2* | 2/2014 | Vassigh | G06F 3/017 348/143 |
| 9,446,304 B2* | 9/2016 | Matsuura | A63F 13/00 |
| 10,137,372 B2* | 11/2018 | Leblanc | A63F 13/90 |
| 10,217,488 B1* | 2/2019 | Huang | H04N 9/8205 |
| 10,391,399 B2* | 8/2019 | Soejima | A63F 13/2145 |
| 10,599,256 B2* | 3/2020 | Kurabayashi | G06F 3/0416 |
| 11,417,004 B2* | 8/2022 | Dube | A63F 13/63 |
| 2005/0075167 A1* | 4/2005 | Beaulieu | G07F 17/3211 463/32 |
| 2008/0010616 A1* | 1/2008 | Algreatly | G06F 3/0362 345/157 |
| 2008/0188303 A1* | 8/2008 | Schlottmann | A63F 9/24 463/43 |
| 2010/0069152 A1* | 3/2010 | Nishimura | A63F 13/525 463/31 |
| 2011/0216002 A1* | 9/2011 | Weising | A63F 13/92 345/158 |
| 2013/0342526 A1* | 12/2013 | Ng | G06T 15/005 345/419 |
| 2014/0019302 A1* | 1/2014 | Meadow | G06Q 30/0623 705/26.61 |
| 2014/0342823 A1* | 11/2014 | Kapulkin | H04N 21/63 463/31 |
| 2015/0031450 A1* | 1/2015 | Matsuura | A63F 13/5258 463/31 |
| 2015/0231509 A1* | 8/2015 | McMain, II | A63F 13/837 463/31 |
| 2016/0307335 A1* | 10/2016 | Perry | H04N 23/90 |
| 2016/0354692 A1* | 12/2016 | Matsuura | A63F 13/25 |
| 2018/0015362 A1* | 1/2018 | Terahata | A63F 13/215 |
| 2018/0093183 A1* | 4/2018 | Leblanc | A63F 13/52 |
| 2018/0157372 A1* | 6/2018 | Kurabayashi | G06F 3/04886 |
| 2018/0276800 A1* | 9/2018 | Abbas | G06T 5/92 |
| 2019/0232154 A1* | 8/2019 | Kurabayashi | G06F 3/0488 |
| 2020/0334788 A1* | 10/2020 | Izumi | G06T 17/10 |
| 2022/0258047 A1* | 8/2022 | Koyama | A63F 13/57 |

OTHER PUBLICATIONS

International Search Report issued in PCT/JP2020/040401, mailed on Dec. 15, 2020 (7 pages).

Written Opinion of the International Searching Authority PCT/JP2020/040401, mailed on Dec. 15, 2020 (3 pages).

* cited by examiner

PROGRAM, GAME-VIRTUAL-SPACE PROVIDING METHOD, AND GAME-VIRTUAL-SPACE PROVIDING DEVICE

TECHNICAL FIELD

The present invention relates to a program for providing a game virtual space, a game-virtual-space providing method, and a game-virtual-space providing device.

BACKGROUND ART

Patent Literature 1 describes a game device etc. capable of performing image representation of a real celestial body (for example, sun, moon, star, star group, or the like) in which the position representing the earth in a game space and the elapse of game time are reflected.

CITATION LIST

Patent Literature

{Patent Literature 1} Japanese Unexamined Patent Application, Publication No. 2000-342854

SUMMARY OF INVENTION

Technical Problem

In a game device such as that described in Patent Literature 1, in order to display the sun in a game space, a sun object that is recorded in advance is read and is placed in the game space. However, in such image processing technology, the display form of the sun in the game space cannot be finely controlled. Thus, in the conventional image processing technology, the display of the sun in the game space may not be flexibly and dynamically controlled.

Thus, an object of this disclosure is to provide a program, a game-virtual-space providing method, and a game-virtual-space providing device for flexibly and dynamically executing display control of a target in a game virtual space.

Solution to Problem

According to an aspect, the present invention provides a program for causing a computer that provides a game virtual space in which a game object is placed in a predetermined plane, to function as: a generation unit that generates the game virtual space, which is a spherical coordinate space; an acquisition unit that acquires information related to a cartesian coordinate system including the position of a target to be displayed in the game virtual space; a conversion unit that converts the cartesian coordinate system into a polar coordinate system on the basis of the information; and a display control unit that displays the target at a position in the game virtual space corresponding to the position in the cartesian coordinate system on the basis of information related to the polar coordinate system, wherein the display control unit controls a display form of the target in the game virtual space on the basis of a predetermined condition.

According to another aspect, the present invention provides a game-virtual-space providing method executed by a computer that provides a game virtual space in which a game object is placed in a predetermined plane, the method including: a step of generating the game virtual space, which is a spherical coordinate space; a step of acquiring information related to a cartesian coordinate system including the position of a target to be displayed in the game virtual space; a step of converting the cartesian coordinate system into a polar coordinate system on the basis of the information; and a step of displaying the target at a position in the game virtual space corresponding to the position in the cartesian coordinate system on the basis of information related to the polar coordinate system, wherein, in the step of displaying, a display form of the target in the game virtual space is controlled on the basis of a predetermined condition.

According to still another aspect, the present invention provides a game-virtual-space providing device that provides a game virtual space in which a game object is placed in a predetermined plane, the device including: a generation unit that generates the game virtual space, which is a spherical coordinate space; an acquisition unit that acquires information related to a cartesian coordinate system including the position of a target to be displayed in the game virtual space; a conversion unit that converts the cartesian coordinate system into a polar coordinate system on the basis of the information; and a display control unit that displays the target at a position in the game virtual space corresponding to the position in the cartesian coordinate system on the basis of information related to the polar coordinate system, wherein the display control unit controls a display form of the target in the game virtual space on the basis of a predetermined condition.

Note that the present invention also includes a case in which "units" and "devices" do not mean simply physical means, and the functions of the "units" and "devices" are realized by software. Furthermore, it is also possible to realize the function of one "unit" or "device" by means of two or more physical means or devices and to realize the functions of two or more "units" or "devices" by means of one physical means or device.

Advantageous Effects of Invention

According to the above-described aspects of the present invention, it is possible to flexibly and dynamically execute display control of a target in a game virtual space.

DESCRIPTION OF EMBODIMENTS

An embodiment of the present invention will be described below with reference to the drawings. Note that the embodiment to be described below is merely an example and does not intend to exclude various modifications and applications of technology that are not specified below. That is, the present invention can be embodied by being variously modified (by combining examples) without departing from the spirit thereof. Furthermore, in the following description of the drawings, identical or similar reference signs are assigned to identical or similar portions. The drawings are schematic and do not necessarily match actual dimensions, ratios, etc. The drawings may include portions having dimensions, ratios, etc. different therebetween.

Figure 1:
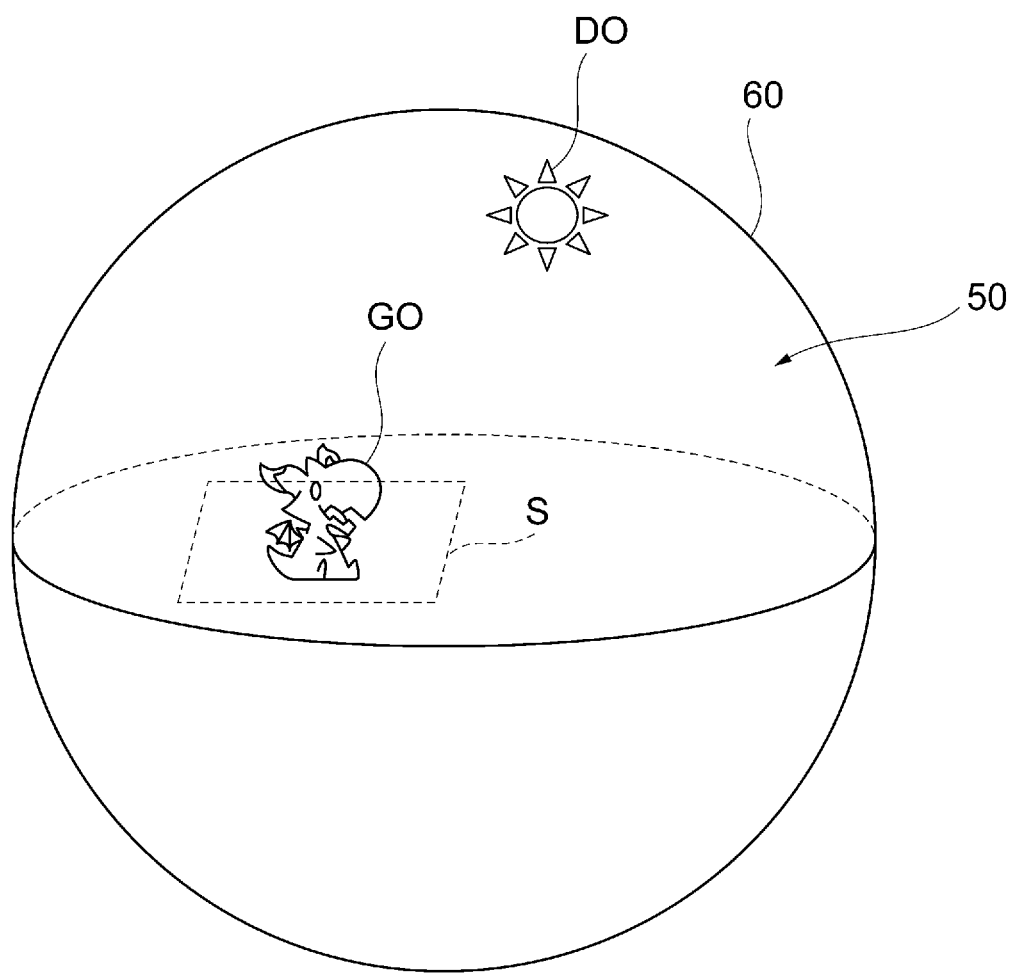
FIG. 1 is an explanatory view showing an example of a sphere object that encompasses a game virtual space, in which a game object is placed in a predetermined plane, according to an embodiment of the present invention.

FIG. 1 is an explanatory view showing an example of a sphere object according to an embodiment of the present invention. As shown in FIG. 1, a sphere object 60 encompasses, for example, a game virtual space 50 in which a game object GO is placed on a game field S (predetermined plane). The game virtual space 50 of this embodiment is, for example, a spherical coordinate space. The sphere object 60 may be a perfect sphere, as shown in FIG. 1, or may be a hemisphere. The game virtual space 50 is configured such that one of a plurality of game fields S that imitate different areas on the earth, for example, can be selected. In the game virtual space 50, the position on the area corresponding to each of the game fields S is reflected, or the advancing or elapsing of the game time is reflected.

For example, a sun that is an example of a display object DO (target) is generated (displayed) at a pole of the sphere object 60 by a shader according to the embodiment of the present invention. The shader is a computer program for performing shading (shading processing) in 3D computer graphics, for example. The shader is a portion of a renderer that executes calculations on the color of a display object in the game virtual space 50, for example. The display object DO includes a display object formed by imitating a celestial body, and may include, for example, a moon, a star, a star group, etc., in addition to the above-mentioned sun. In this embodiment, the result output from the shader, which determines a light-emission status and a prominence shape of the sun in the game virtual space 50, is subjected to polar conversion (for example, conversion from a plane coordinate system to a spherical coordinate system). Then, the result of the polar conversion is mapped on the sphere object 60, which encompasses the game virtual space 50 (see FIG. 6, to be described later), whereby the sun is expressed in the game virtual space 50 (see FIGS. 8, 9(a), and 9(b), to be described later).

Thus, it is possible to finely control parameters related to the sun in the game virtual space 50, for example, parameters related to the shape of the sun, the amount of light, or representation of prominence, etc. For example, dynamic motion of rays (light) that look like sun light can be represented through a procedural technology using the shader. Therefore, in this embodiment, it is possible to execute display control of the sun flexibly and dynamically.

Figure 2:
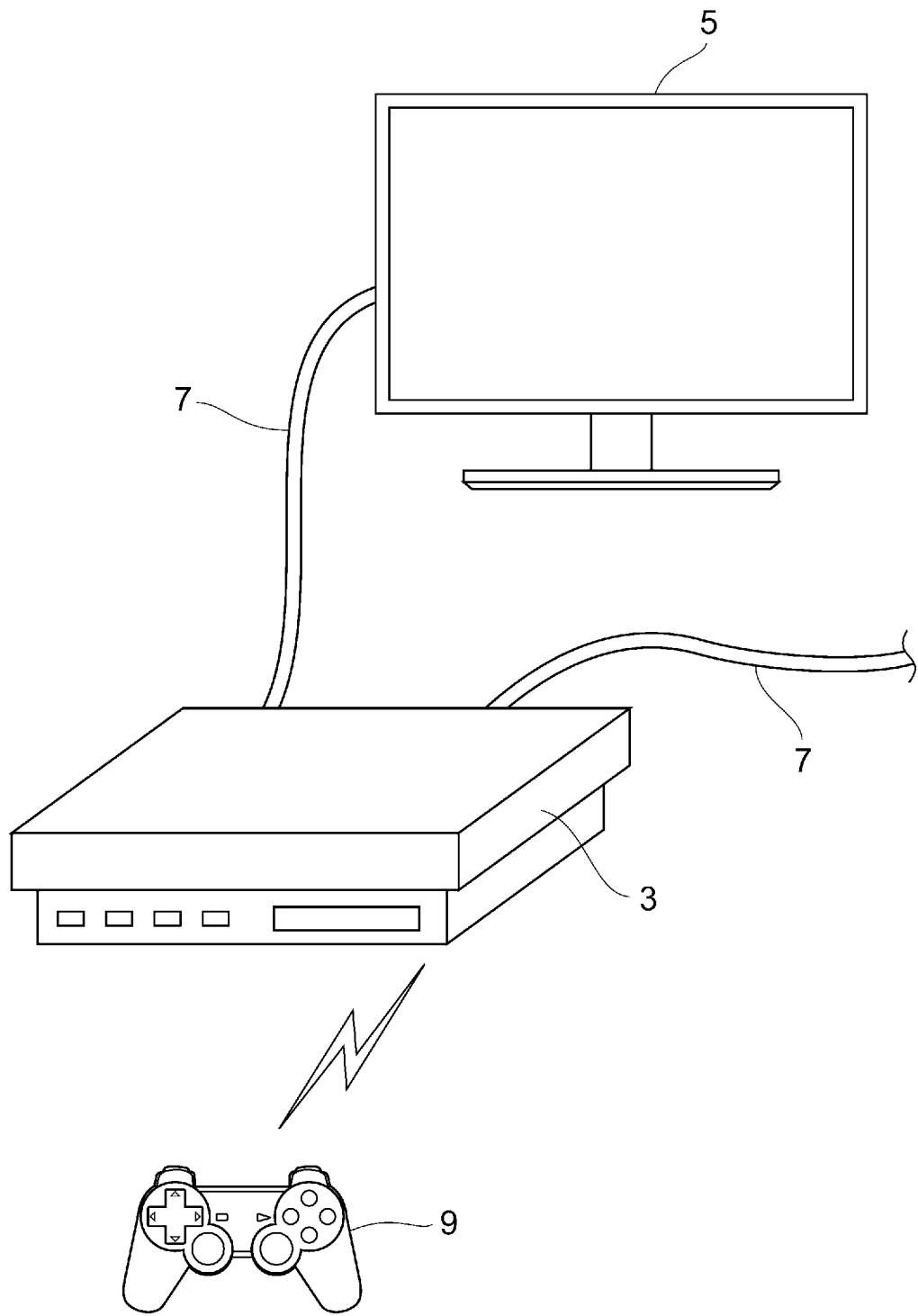
FIG. 2 is a view showing, in outline, the configuration of a game-virtual-space providing system according to the embodiment of the present invention.

FIG. 2 is a view showing, in outline, the configuration of a game-virtual-space providing system according to the embodiment of the present invention. As shown in FIG. 2, a game-virtual-space providing system 1 is configured to include illustratively: a game-virtual-space providing device 3 that defines and provides a game virtual space; a reproduction device 5 that reproduces audio data or image data including the game virtual space provided by the game-virtual-space providing device 3; and an input device 9 that is operated by a user.

The reproduction device 5 is a device for outputting an image and outputting audio and reproduces predetermined content. For example, the reproduction device 5 may be a television having a display and a speaker or may be a computer display. The reproduction device 5 may be connected to the game-virtual-space providing device 3 by a wired cable or a wireless local area network (LAN).

The input device 9 is a device for sending a control signal corresponding to operation information input by the user, to the game-virtual-space providing device 3. In this embodiment, the input device 9 is configured so as to be able to wirelessly communicate with the game-virtual-space providing device 3. The input device 9 and the game-virtual-space providing device 3 establish wireless connection by using, for example, the Bluetooth (registered trademark) protocol or the like. Note that the input device 9 and the game-virtual-space providing device 3 may also be configured so as to send the above-mentioned control signal via a wired cable.

The game-virtual-space providing device 3 implements the game-virtual-space providing function by loading an application program for providing a game virtual space. The game-virtual-space providing device 3 is, for example, a game machine or may be a personal computer, a tablet terminal, or a mobile terminal such as a smartphone.

The game-virtual-space providing device 3 has a universal serial bus (USB) terminal, thereby being able to be connected to an external device, such as a personal computer, via a cable 7 and being able to obtain various kinds of information from the external device. Furthermore, the game-virtual-space providing device 3 has a media drive and is configured to obtain various kinds of information from a ROM medium. Furthermore, the game-virtual-space providing device 3 may also be configured so as to be able to obtain various kinds of information from an external server or the like via a network. Note that, although the input device 9, the reproduction device 5, and the game-virtual-space providing device 3 are separate bodies in this embodiment, these devices may also be configured as a united body. For example, the input device 9, the reproduction device 5, and the game-virtual-space providing device 3 may also be configured as a mobile terminal device for executing game-virtual-space providing processing.

Figure 3:
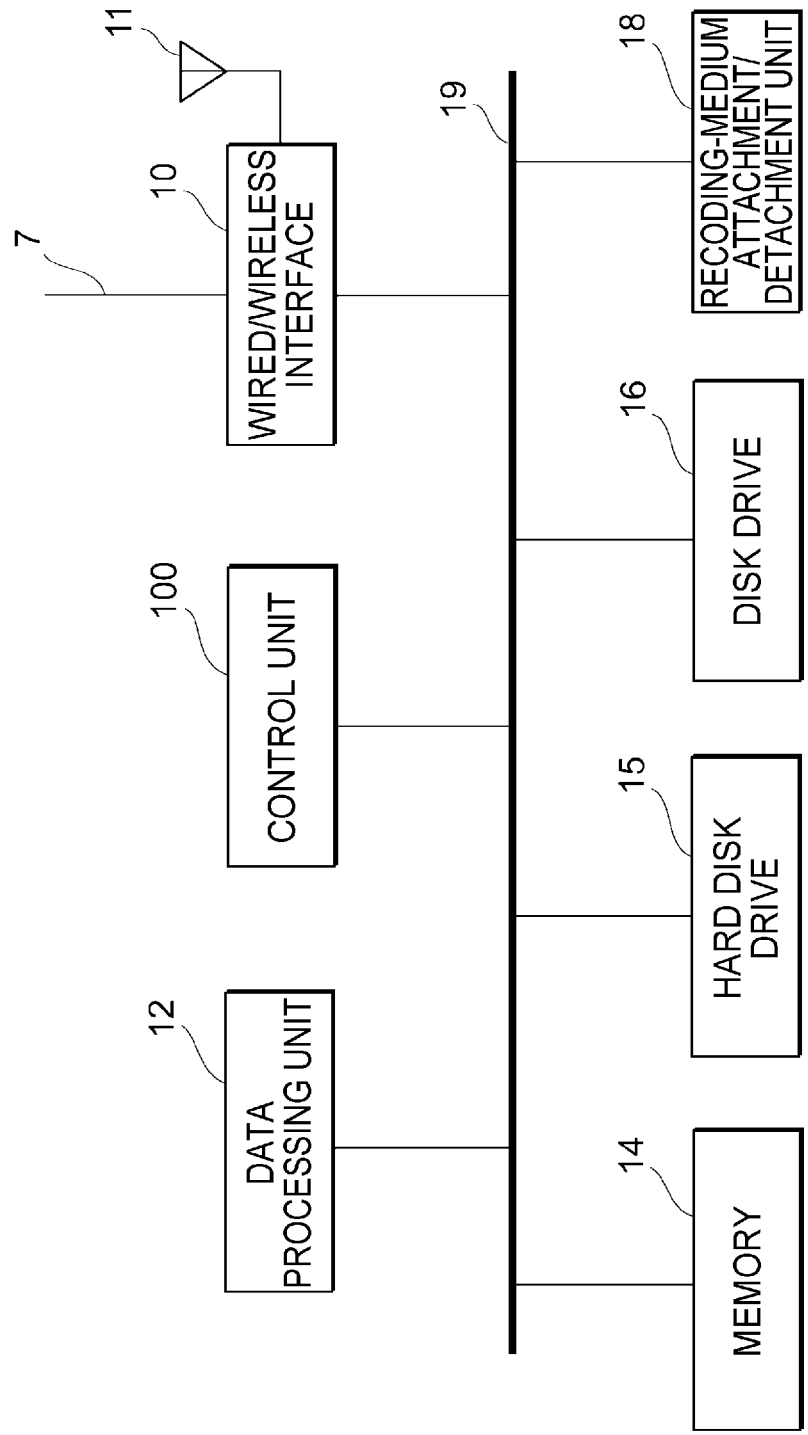
FIG. 3 is a diagram showing, in outline, a hardware configuration of a game-virtual-space providing device according to the embodiment of the present invention.

FIG. 3 is a diagram showing, in outline, a hardware configuration of the game-virtual-space providing device according to the embodiment of the present invention. As shown in FIG. 3, the game-virtual-space providing device 3 is configured to include, illustratively, a wired/wireless interface 10, an antenna 11, a data processing unit 12, a memory 14, a hard disk drive 15, a disk drive 16, a recoding-medium attachment/detachment unit 18, and a control unit 100. These individual constituents are configured so as to input and output various kinds of information and data via a bus 19.

The wired/wireless interface 10 is a means that is connected to an external device by wire or wirelessly and that sends and receives data. The wired/wireless interface 10 is connected to an external device via the above-mentioned predetermined cable 7 to obtain various kinds of information from the external device. Furthermore, the wired/wireless interface 10 is connected to the input device 9 according to a predetermined wireless communication protocol. A control signal from the input device 9 is supplied to the control unit 100 via the antenna 11, the wired/wireless interface 10, and the bus 19. Note that the wired/wireless interface 10 may also be configured such that a wired interface unit and a wireless interface unit are united into one body or remain as separate bodies.

The data processing unit 12 is configured to include a frame memory or the like that buffers video/audio data composing content to be reproduced by the reproduction device 5.

The memory 14 is configured as a random access memory (RAM) and is configured to include, for example, a main memory and a buffer memory.

The hard disk drive 15 is an auxiliary storage device for storing various kinds of information and data. The hard disk drive 15 stores various kinds of information and data received via the wired/wireless interface 10, for example, and stores various kinds of information and data read from a removable recording medium by the recoding-medium attachment/detachment unit 18, as will be described later.

The disk drive 16 is a device that drives a read-only ROM disk to read data therefrom. The disk drive 16 reads data stored in the ROM disk when the ROM disk is installed therein. The ROM disk is, for example, an optical disk, a magneto-optical disk, etc.

The recoding-medium attachment/detachment unit 18 is a device that reads data from a removable recording medium when the removable recording medium is installed therein. Here, a program related to the game-virtual-space providing processing, to be described later, in this embodiment may also be configured to be recorded in a removable recording medium or a ROM disk and to be installed in the hard disk drive 15 from the recoding-medium attachment/detachment unit 18 or the disk drive 16. Furthermore, this program may also be obtained from an external server or the like via a network.

The control unit 100 is configured to include a CPU and controls processing executed by the above-described individual constituents included in the game-virtual-space providing device 3. Furthermore, the control unit 100 is configured to include a plurality of processor cores in the CPU. Furthermore, the control unit 100 is configured to include a memory controller connected to the memory 14.

Figure 4:
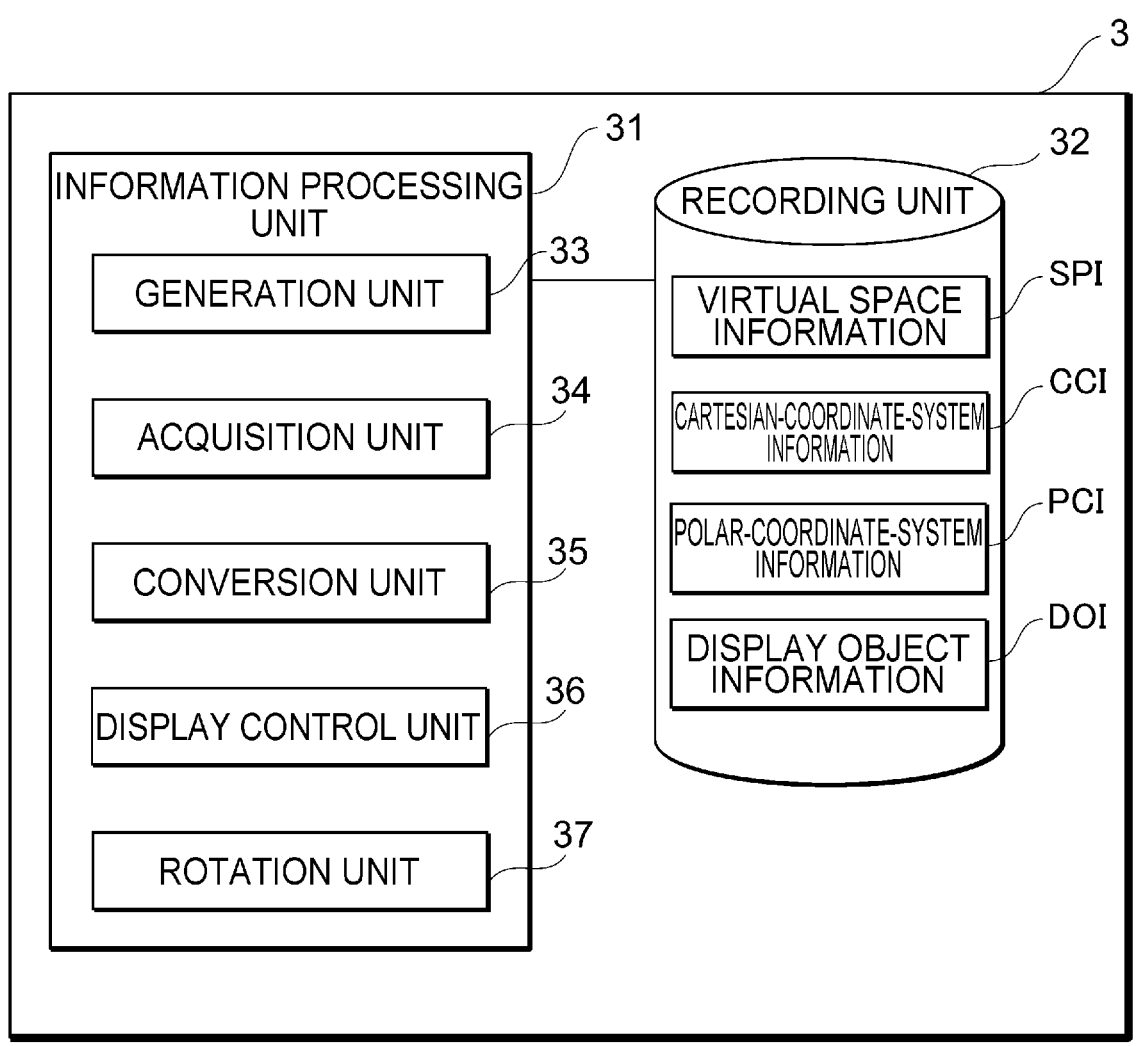
FIG. 4 is a diagram showing, in outline, an example of the functional configuration of the game-virtual-space providing device according to the embodiment of the present invention.

FIG. 4 is a block diagram showing an example of the functional configuration of the game-virtual-space providing device according to the embodiment of the present invention. As shown in FIG. 4, the game-virtual-space providing device 3 is configured to include, illustratively, an information processing unit 31 that executes processing for providing a game virtual space, and a recording unit 32 that records various kinds of information needed for executing the processing and information related to a result of the processing. Note that the information processing unit 31 can be realized when the control unit 100 executes programs stored in the memory 14 etc., shown in FIG. 3, for example. The recording unit 32 corresponds to the hard disk drive 15, shown in FIG. 3, for example.

The recording unit 32 records, illustratively, virtual space information SPI, cartesian-coordinate-system information CCI that is information related to the cartesian coordinate system, polar-coordinate-system information PCI that is information related to the polar coordinate system, and display object information DOI related to the display object DO. In the recording unit 32, information related to a user who executes a game or other information may be further recorded in addition to the above-mentioned items of information.

The virtual space information SPI includes at least one game-virtual-space data template or the like for defining the game virtual space 50, shown in FIG. 1, for example. The game-virtual-space data template is defined on the basis of information indicating the shape etc. of the sphere object 60. Furthermore, the game-virtual-space data template is recorded so as to be able to appropriately generate a virtual space in accordance with the time zone of the game virtual space 50. For example, in the case where the game virtual space 50 is at nighttime, a texture of a starry sky is mapped on an inner wall surface of the sphere object 60, for example, whereby the game virtual space 50 including a night sky is generated. The virtual space information SPI may also further include information related to game time in the game virtual space 50.

The cartesian-coordinate-system information CCI includes, for example, the position of the display object DO to be displayed in the game virtual space 50. The polar-coordinate-system information PCI includes information related to the polar coordinate system generated after the cartesian coordinate system is converted by a conversion unit 35, to be described later.

The display object information DOI includes information for displaying the display object DO in the game virtual space 50. The display object information DOI includes geometry information on the display object DO, for example. The geometry information includes information about the shape of the display object DO, which is a drawing target in the game virtual space 50, and about coefficients in an equation expressing a figure, such as the vertex coordinates, line segments, and surfaces that define the shape.

In the case where the display object DO is the sun, the display object information DOI may include parameters related to the shape of the sun, the amount of light, representation of prominence, etc. The display object information DOI is managed by leveling the amount of light of the sun in the game virtual space 50, in a stepwise manner, for example. It is possible to display the brightest sun in the case where the sun light level is 1 and to display the sun whose brightness degree is reduced as the light level is increased like 2, 3, 4, etc. Furthermore, the above-mentioned parameters may also be set such that the display form of the display object DO in the game virtual space 50 shown in FIG. 1 can be changed in accordance with the position of the game object GO placed on the game field S in the game virtual space 50. The display form of the display object DO includes, for example, the shape, colors, or the presence or absence of highlight of the display object DO, in addition to the orientation of display or the direction of display of the display object DO.

Furthermore, the display object information DOI may also be set in accordance with the game time in the game virtual space 50. For example, in the case where the game time is daytime in the game virtual space 50, the light level of the sun is set high in order to make the brightest sun appear, and, in the case where the game time is dusk, the light level of the sun is set low in order to make the sun whose brightness is reduced appear.

Note that at least a portion of the display object information DOI may be included in the cartesian-coordinate-system information CCI, which includes the position of the display object DO, and may be managed.

The recording unit 32 may further record game-object information. The game-object information is information related to the game object GO placed in the game virtual space 50, as shown in FIG. 1. The game object GO includes image information corresponding to a character or an avatar associated with the user in advance. The game object GO may be one or a plurality of kinds of characters or avatars (for example, an image of a deformed person, an image imitating an animal, etc.). The game object GO may include, for example, information of images imitating plants, such as grass, trees, and flowers, and, in addition, woods or forest, placed on the game field S in the game virtual space 50. The game object GO is not limited to those objects described above and may also include information about images imitating streetscape etc. Furthermore, the game-object information includes information for placing the game object GO in the game virtual space 50 (for example, positional information about the game object GO, information related to a display form, or the like).

The information processing unit 31 functionally includes a generation unit 33, an acquisition unit 34, the conversion unit 35, a display control unit 36, and a rotation unit 37.

The generation unit 33 generates the game virtual space 50, shown in FIG. 1, on the basis of the virtual space information SPI, which is recorded in the recording unit 32. The generation unit 33 may also manage the advancing or elapsing of the game time in the game virtual space 50, for example.

The acquisition unit 34 obtains the cartesian-coordinate-system information CCI, which includes the position of the display object DO to be displayed in the game virtual space 50. The acquisition unit 34 may obtain the cartesian-coordinate-system information CCI from the recording unit 32 or obtain the cartesian-coordinate-system information CCI from outside the game-virtual-space providing device 3.

The conversion unit 35 converts the cartesian coordinate system into the polar coordinate system on the basis of the cartesian-coordinate-system information CCI obtained by the acquisition unit 34.

Figure 5:
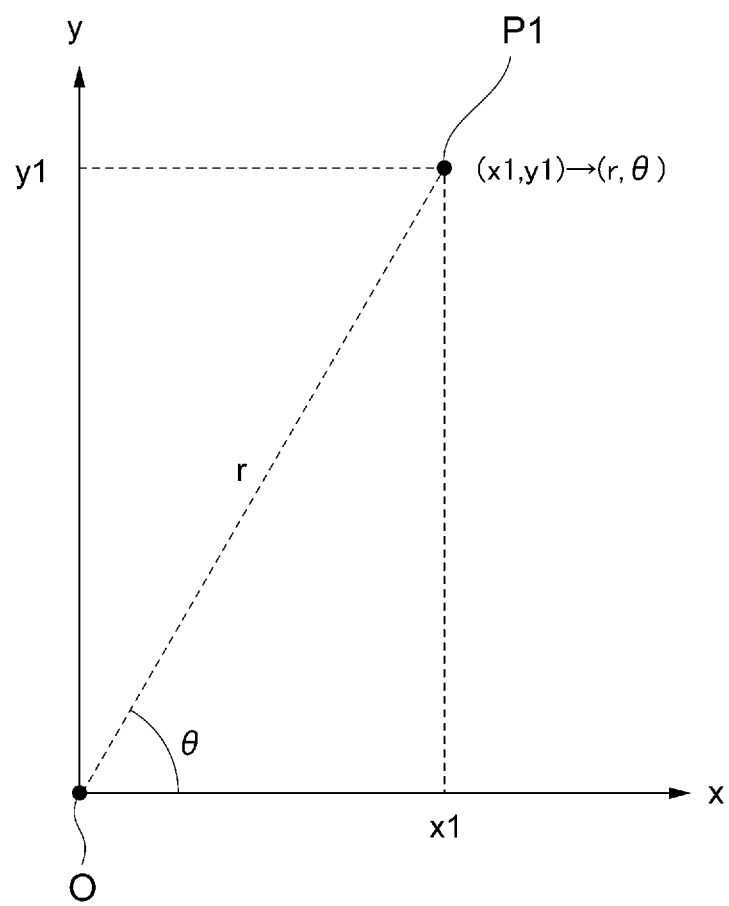
FIG. 5 is an explanatory view showing an example of coordinate-system conversion processing according to the embodiment of the present invention.

FIG. 5 is an explanatory view showing an example of coordinate-system conversion processing according to the embodiment of the present invention. The coordinate-system conversion processing will be described below by using a 2D coordinate system, for example. As shown in FIG. 5, the conversion unit 35 converts cartesian coordinates (x1, y1) that indicate the position P1 of the display object DO into polar coordinates (r, θ) that are expressed by the distance r from the origin O and an angle θ from the x axis, by using the following equation 1.

$$x = r \cos\theta, \; y = r \sin\theta \qquad \text{(Equation 1)}$$

where r and θ satisfy conditions of r≥0 and 0≤θ<2π.

Furthermore, the coordinate-system conversion processing may be executed by using a 3D coordinate system. For example, the conversion unit 35 may convert the cartesian coordinates (x, y, z) of a specific position in the 3D coordinate system into three parameters of the polar coordinates (r, θ, φ). Here, for example, r corresponds to the distance from the origin, θ corresponds to a polar angle, and φ corresponds to the azimuth.

Figure 6:
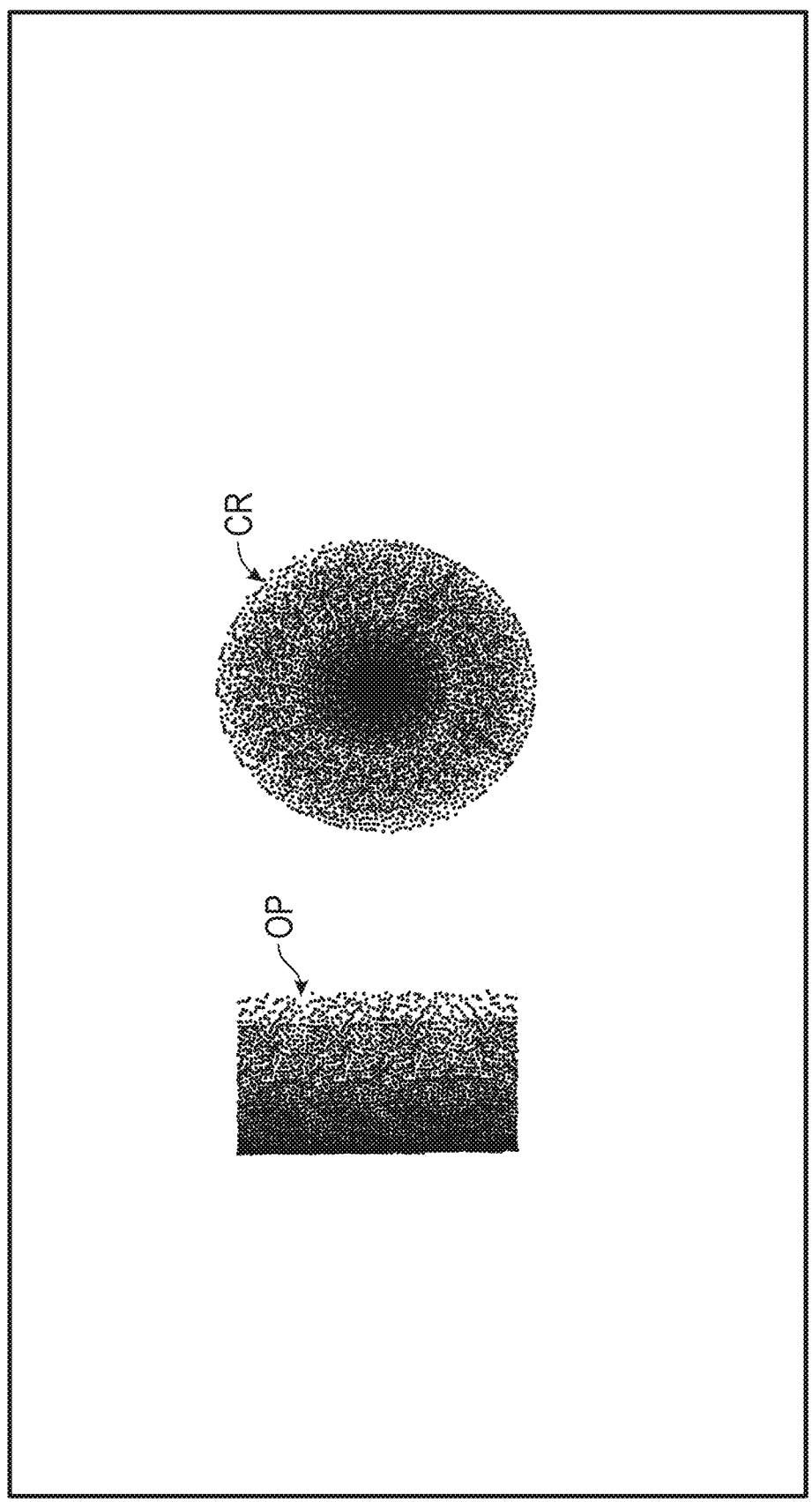
FIG. 6 is an explanatory view showing an example case in which a light-emission status, a prominence shape, etc. of the sun are subjected to polar conversion, according to the embodiment of the present invention.

FIG. 6 is an explanatory view showing an example of polar conversion, in the 2D coordinate system, of a light-emission status, a prominence shape, etc., of the sun, according to the embodiment of the present invention. As shown in FIG. 6, the conversion unit 35 subjects an output result OP from the shader, which determines, for example, the condition of light and the shape of the prominence of the sun, to polar conversion (for example, conversion from a plane coordinate system into a spherical coordinate system) and maps the conversion result in a spherical manner (see a conversion result CR).

Returning to FIG. 4, the display control unit 36 displays the display object DO at the position in the game virtual space 50 corresponding to the position in the cartesian coordinate system, on the basis of the polar-coordinate-system information PCI obtained through the conversion processing of the conversion unit 35.

Figure 7:
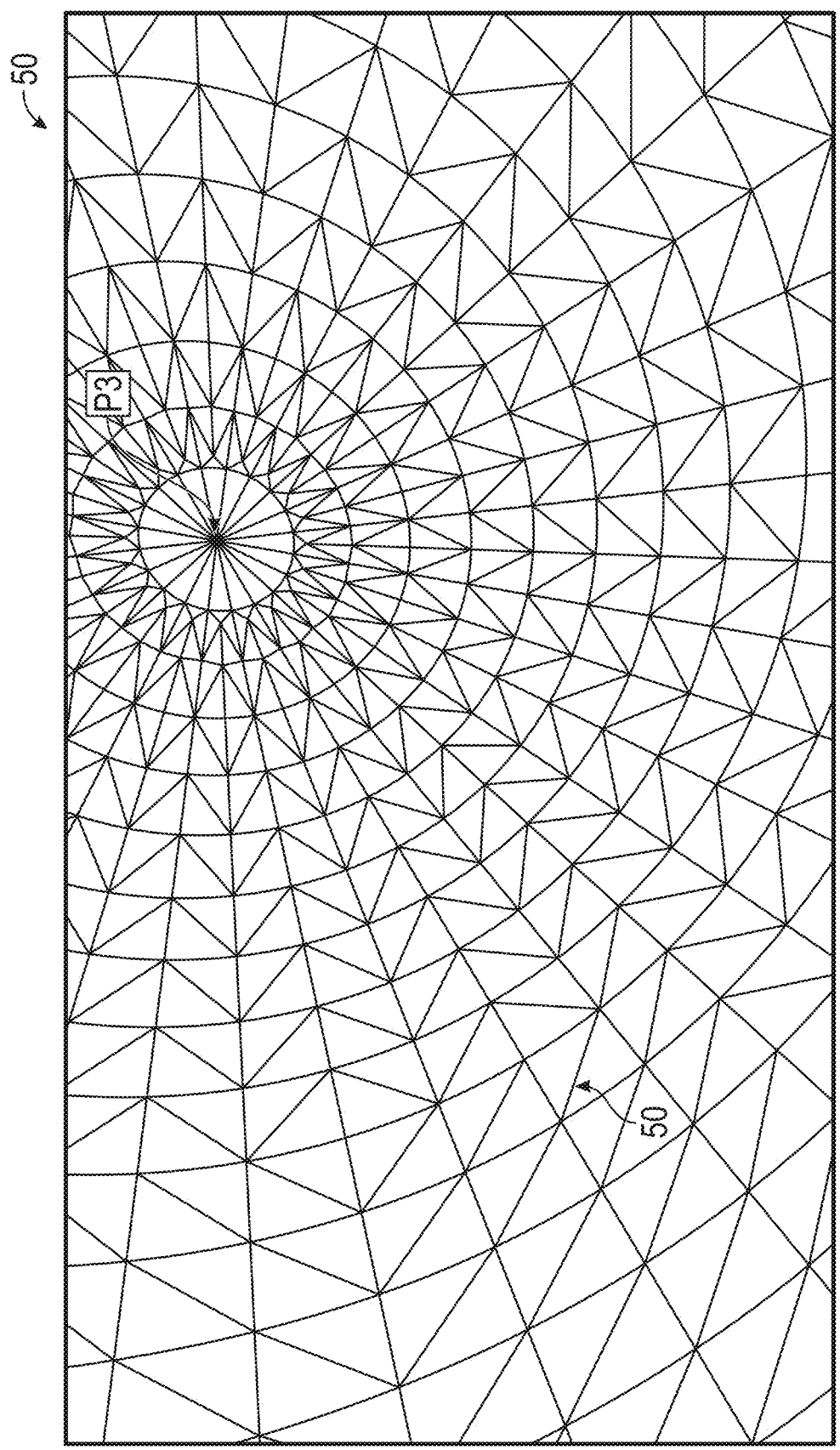
FIG. 7 is a view showing an example of a status in which a texture of the sun is placed on the sphere object, which encompasses the game virtual space according to the embodiment of the present invention.
Figure 8:
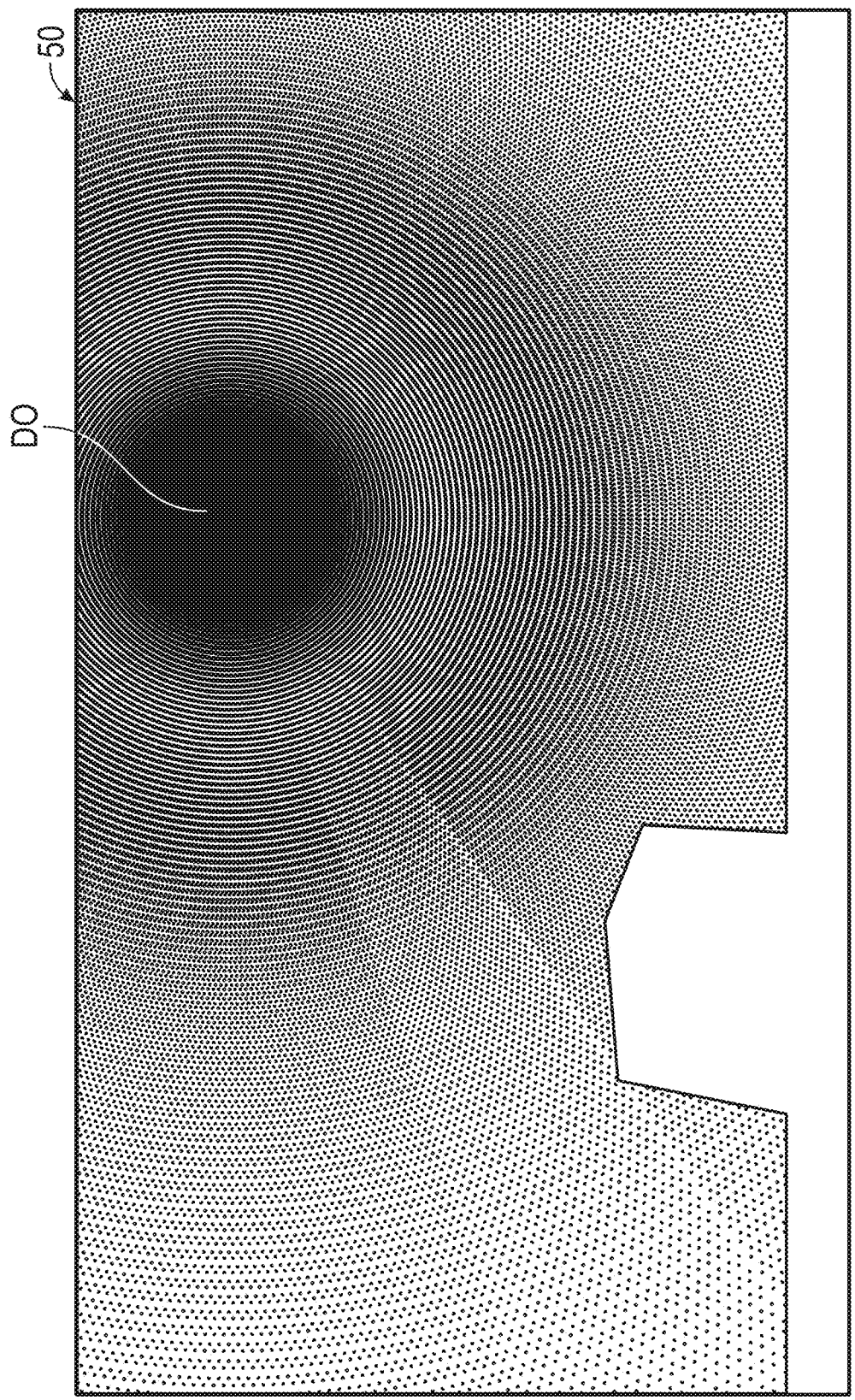
FIG. 8 is an explanatory view showing an example of display processing of the sun in the game virtual space according to the embodiment of the present invention.

FIG. 7 is a view showing an example of a status in which a texture of the sun is placed on the sphere object, which encompasses the game virtual space according to the embodiment of the present invention. FIG. 8 is an explanatory view showing an example of display processing of the sun in the game virtual space according to the embodiment of the present invention. As shown in FIGS. 7 and 8, the display control unit 36 refers to the polar-coordinate-system information PCI, which is obtained through the polar conversion, and displays the sun at a position P3 in the game virtual space 50 formed by the sphere object 60 on which the texture of the sun is placed, the position P3 corresponding to the position of the sun in the cartesian coordinate system.

The game-virtual-space providing device 3 of this embodiment converts information related to the cartesian coordinate system and uses information related to the polar coordinate system, which is obtained after the conversion, to map the display object DO on the sphere object 60. Thus, compared with a case in which the information related to the cartesian coordinate system is used to map the display object DO on the sphere object 60, information processing in the mapping processing of the display object DO on the sphere object 60, which has a curved surface, is simplified.

Returning to FIG. 4, the display control unit 36 controls the display form of the display object DO in the game virtual space 50 on the basis of a predetermined condition. The predetermined condition includes a condition as to whether there is a predetermined instruction from a user, a condition as to whether a predetermined time of the game time has advanced or elapsed, or a condition as to whether the game time has reached a predetermined time zone (morning, day, evening, night, etc.).

Figure 9A:
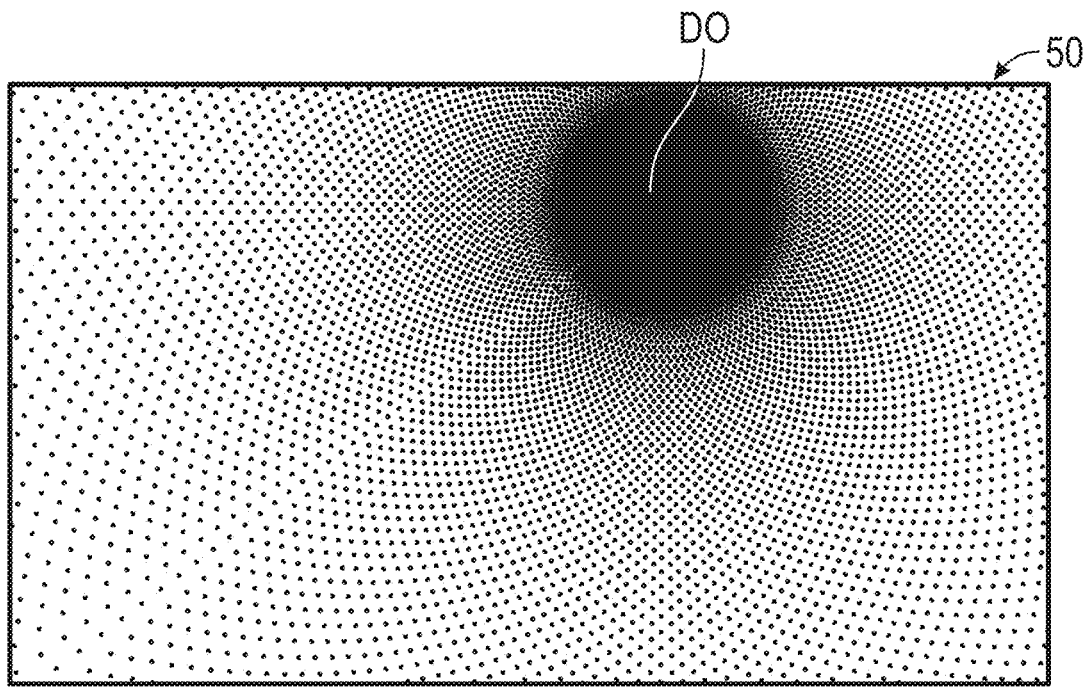
FIGS. 9(a) and 9(b) have explanatory views showing examples of control processing of the display form of the sun in the game virtual space according to the embodiment of the present invention.
Figure 9B:
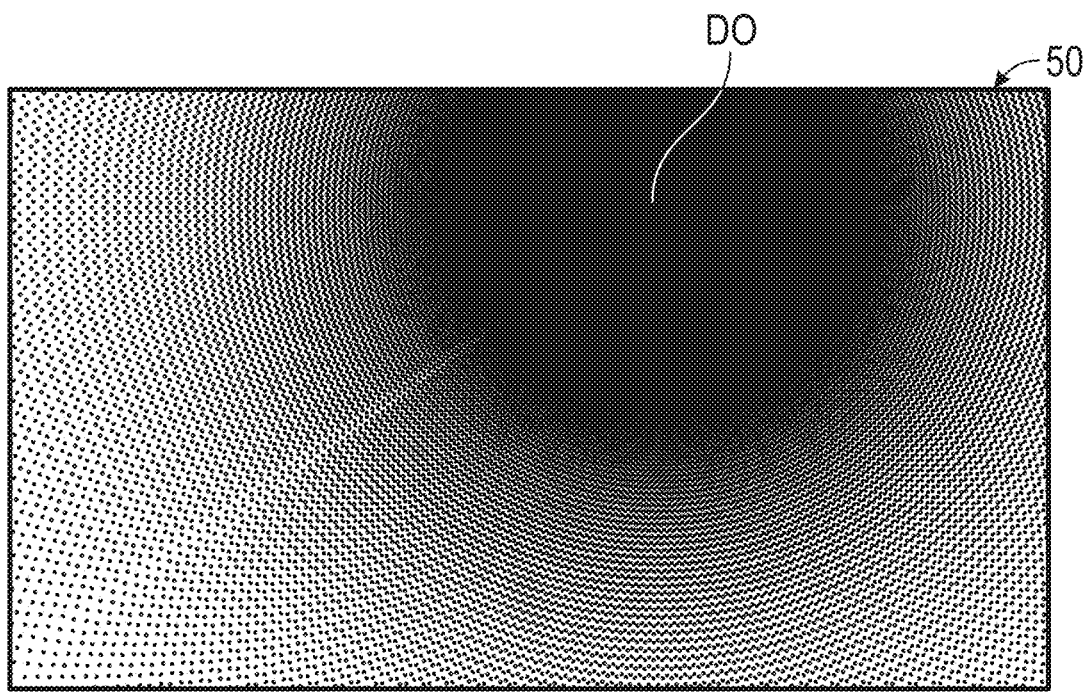

FIGS. 9(*a*) and 9(*b*) have explanatory views showing examples of control processing of the display form of the sun in the game virtual space according to the embodiment of the present invention. The intensity of light of the display object DO, which indicates the sun, in the game virtual space 50 shown in FIG. 9(A) is less than the intensity of light of the display object DO, which indicates the sun, in the game virtual space 50 shown in FIG. 9(B). That is, the display object DO, which indicates the sun, shown in FIG. 9(B) is drawn so as to be brighter than the display object DO, which indicates the sun, shown in FIG. 9(A). As shown in FIGS. 9(A) and 9(B), the display control unit 36 calculates the amount of attenuation of light from the center of the display object DO, which indicates the sun, in the game virtual space 50 on the basis of a predetermined instruction from the user (for example, reception of an input signal for controlling the intensity of light of the sun by means of the shader), to control the intensity of light of the sun so as to correspond to the instruction.

Furthermore, in addition to the method for controlling the display form of the display object DO on the basis of the instruction from the user, the display control unit 36 may control the display form of the display object DO on the basis of whether a predetermined time of the game time has advanced or elapsed or whether the game time has reached a predetermined time zone (morning, day, evening, night, etc.). In the case where the game time corresponds to daytime in the game virtual space 50, for example, the display control unit 36 may make the brightest sun appear. Furthermore, when the game time corresponds to an evening time zone in the game virtual space 50, the display control unit 36 may make the sun whose brightness is reduced appear.

Note that the display control unit 36 displays the display object DO, which is displayed in the game virtual space 50 shown in FIG. 1, for example, in the orientation (the display form) in accordance with the position of the game object GO placed on the game field S in the game virtual space 50. According to this configuration, the display object DO is always displayed so as to face the game object GO.

Returning to FIG. 4, the rotation unit 37 rotates the game virtual space 50 about at least one of a reference position and a reference axis such that the display object DO can move along a predetermined trajectory in the game virtual space 50.

Figure 10:
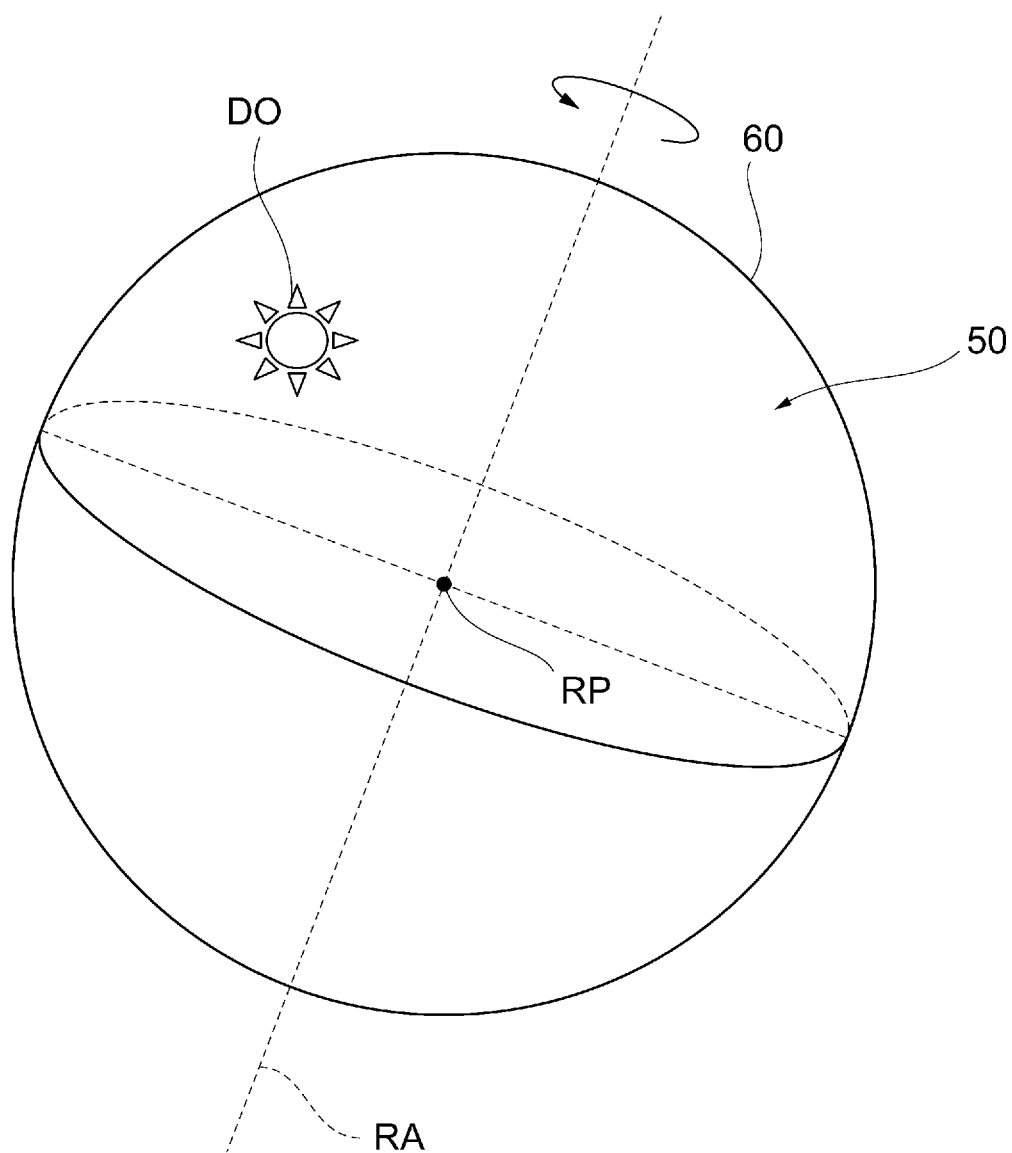
FIG. 10 is an explanatory view showing an example of a rotation status of the sphere object, which encompasses the game virtual space according to the embodiment of the present invention.

FIG. 10 is an explanatory view showing an example of a rotation status of the sphere object, which encompasses the game virtual space according to the embodiment of the present invention. As shown in FIG. 10, the rotation unit 37 rotates the sphere object 60 about a reference axis RA in accordance with the advancing or elapsing of the game time in the game virtual space 50, for example. Furthermore, the rotation unit 37 may rotate the sphere object 60 about a reference point RP in accordance with the advancing or elapsing of the game time in the game virtual space 50.

Thus, the sphere object 60 (or the game virtual space 50) rotates, whereby the display object DO displayed in the game virtual space 50 is represented so as to be movable along the predetermined trajectory in the game virtual space 50. Therefore, movement of the display object DO in the game virtual space 50 can be easily represented. Note that rotation of the sphere object 60 may be executed in accordance with an instruction from the user or a predetermined other regulation, in addition to the case of being executed in accordance with the advancing or elapsing of the game time. Furthermore, as described above, the display position of the display object DO in the game virtual space 50 is changed when the rotation unit 37 rotates the sphere object 60 (or the game virtual space 50). However, the display position of the display object DO may be changed by another method. For example, the display position of the display object DO may be controlled in accordance with the placement position of the game object GO placed in the game virtual space 50. More specifically, the display position of the display object DO may be controlled so as to be at a predetermined distance from the placement position of the game object GO placed in the game virtual space 50. Note that the predetermined distance may be fixed or variable.

The rotation unit 37 controls rotation of the game virtual space 50 so as to change the predetermined trajectory in accordance with the advancing (for example, seasonal changes, or the like) of the game time of the game virtual space 50.

Figure 11:
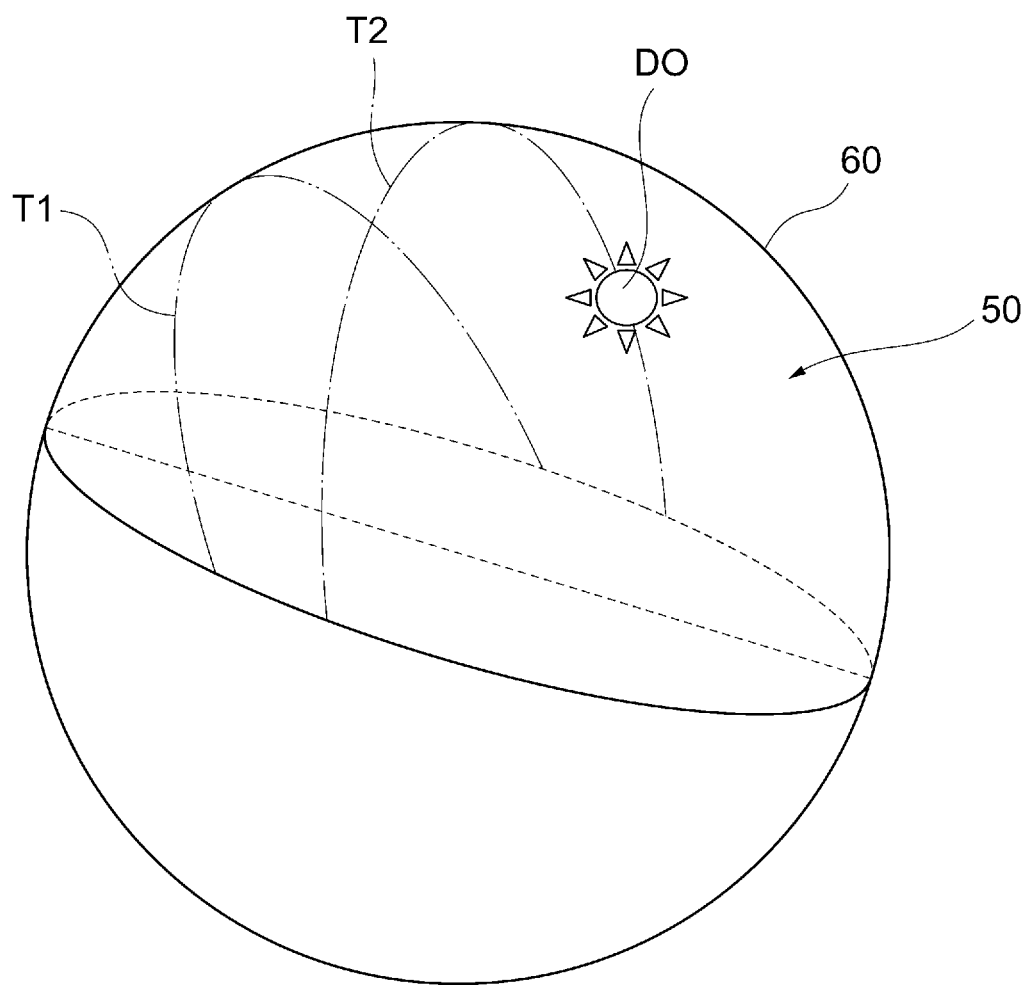
FIG. 11 is an explanatory view showing another example of a rotation status of the sphere object, which encompasses the game virtual space according to the embodiment of the present invention.

FIG. 11 is an explanatory view showing another example of a rotation status of the sphere object, which encompasses the game virtual space according to the embodiment of the present invention. As shown in FIG. 11, the rotation unit 37 controls rotation of the game virtual space 50 such that the display object DO can move along a trajectory T1 in the case where the game time in the game virtual space 50 corresponds to a winter period, for example. Furthermore, the rotation unit 37 controls rotation of the game virtual space 50 such that the display object DO can move along a trajectory T2 in the case where the game time in the game virtual space 50 corresponds to a summer period, for example.

According to this configuration, the rotation unit 37 can appropriately change the trajectory of the display object DO in the game virtual space 50 in accordance with the advancing of the game time.

<Game-Virtual-Space Providing Processing>

Figure 12:
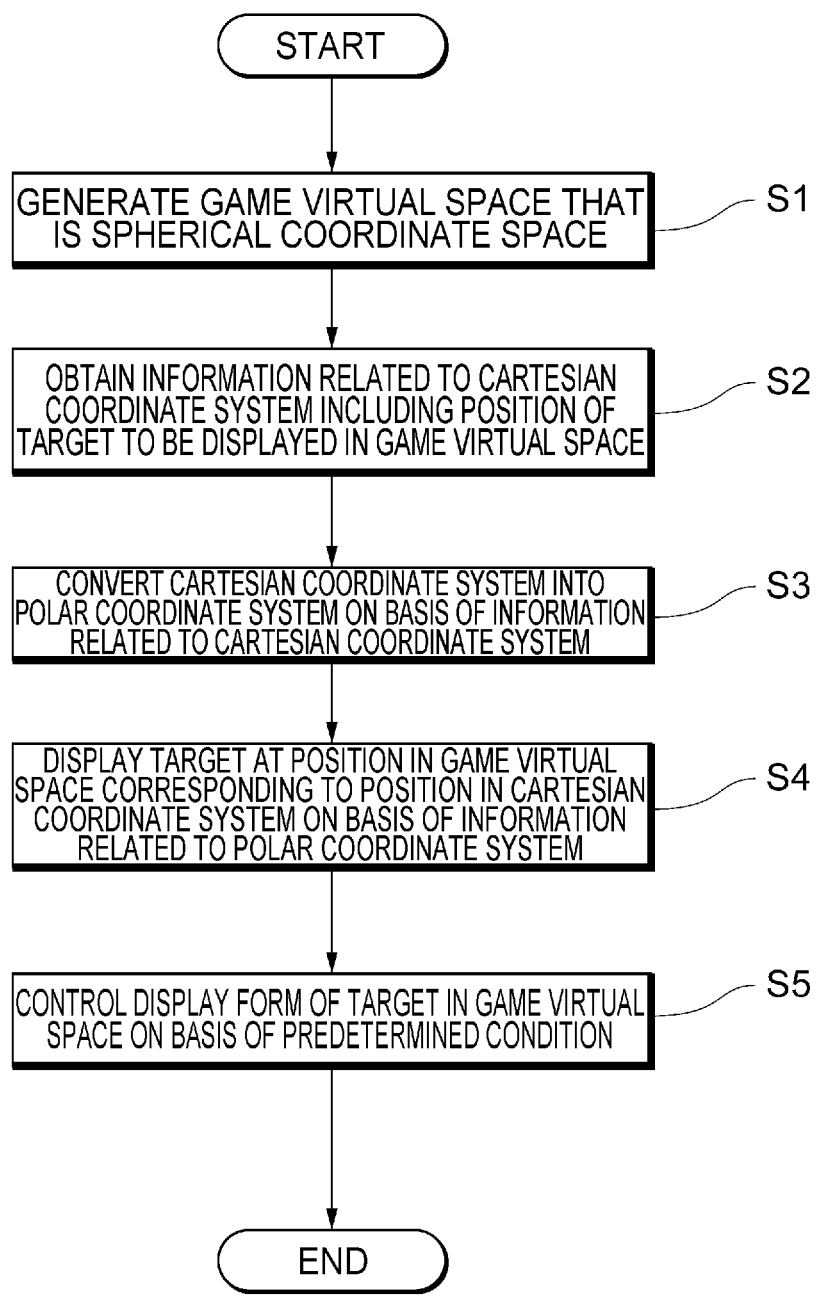
FIG. 12 is a flowchart showing an example of game-virtual-space providing processing according to the embodiment of the present invention.

An example of the game-virtual-space providing processing according to the embodiment of the present invention will be described below with reference to FIG. 12. FIG. 12 is a flowchart showing an example of the game-virtual-space providing processing according to the embodiment of the present invention.

The generation unit 33 of the game-virtual-space providing device 3, shown in FIG. 4, generates a game virtual space in which a game object is placed in a predetermined plane and that is a spherical coordinate space (Step S1). The acquisition unit 34 obtains information related to the cartesian coordinate system including the position of a target to be displayed in the game virtual space (Step S2). The conversion unit 35 converts the cartesian coordinate system into the polar coordinate system on the basis of the information related to the cartesian coordinate system (Step S3). The display control unit 36 displays the target at the position in the game virtual space corresponding to the position in the cartesian coordinate system on the basis of information related to the polar coordinate system (Step S4). The display control unit 36 controls the display form of the target in the game virtual space on the basis of the predetermined condition (Step S5). Note that the individual Steps S1 to S5 are not necessarily executed in this order. For example, Step S1 does not need to be executed before Step S2 and just needs to be executed at least before Step S4.

According to the embodiment described above, the game-virtual-space providing device 3 obtains information related to the cartesian coordinate system including the position of the target to be displayed in the game virtual space 50, converts the cartesian coordinate system into the polar coordinate system on the basis of the obtained information, displays the target at the position in the game virtual space 50 corresponding to the position in the cartesian coordinate system on the basis of information related to the polar coordinate system, and controls the display form of the target in the game virtual space 50 on the basis of the predetermined condition. Thus, the game-virtual-space providing device 3 can finely control the display form of the display object DO in the game virtual space 50. Therefore, the game-virtual-space providing device 3 can flexibly and dynamically execute display control of the display object DO in the game virtual space 50.

Another Embodiment

The above-described embodiment of the present invention is intended to facilitate the understanding of the present invention, and should not be construed to limit the present invention. The present invention may be modified or improved (for example, by combining each embodiment or by omitting a partial configuration of each embodiment) without departing from the spirit thereof, and the present invention encompasses equivalents thereof.

REFERENCE SIGNS LIST 1 game-virtual-space providing system
3 game-virtual-space providing device
5 reproduction device
7 cable
9 input device
10 wired/wireless interface
11 antenna
12 data processing unit
14 memory
15 hard disk drive
16 disk drive
18 recording-medium attachment/detachment unit
19 bus
31 information processing unit
32 recording unit
33 generation unit
34 acquisition unit
35 conversion unit
36 display control unit
37 rotation unit
50 game virtual space
60 sphere object
100 control unit

The invention claimed is:

1. A non-transitory recording medium for causing a computer to perform a method comprising:
generating a game virtual space, which is a spherical coordinate space, wherein the game virtual space has a predetermined plane in which a game object is placed, and wherein the game object corresponds to a celestial body;
determining, by a shader in a renderer computer program, a light-emission status of the game object in the game virtual space;
acquiring cartesian coordinate information of the game object related to a cartesian coordinate system based on the predetermined plane, wherein the cartesian coordinate information comprises a position of a drawing target of the game object to be displayed in the game virtual space;
converting the cartesian coordinate information of the drawing target into polar coordinate information for the drawing target using a polar coordinate system based on a reference axis, wherein the game object rotates within the game virtual space around the reference axis; and
displaying, using the shader, the drawing target of the game object at the position in the game virtual space based on the polar coordinate information and the light-emission status,
wherein displaying the drawing target comprises controlling a display form of the drawing target in the game virtual space based on a predetermined condition.

2. The non-transitory recording medium according to claim 1, wherein the game virtual space rotates about at least one of a reference position and the reference axis such that the drawing target can move along a predetermined trajectory in the game virtual space.

3. The non-transitory recording medium according to claim 2, wherein the game virtual space rotates so as to change the predetermined trajectory in accordance with advancing of time in the game virtual space.

4. The non-transitory recording medium according to claim 1, wherein the celestial body is a sun.

5. The non-transitory recording medium according to claim 1, wherein the predetermined condition corresponds to a predetermined game time elapsing.

6. The non-transitory recording medium according to claim 1, wherein the light-emission status corresponds to a light level among a plurality of light levels with different brightnesses that are controlled using the shader.

7. A game-virtual-space providing method executed by a computer, the game-virtual-space providing method comprising:
generating a game virtual space, which is a spherical coordinate space, wherein the game virtual space has a predetermined plane in which a game object is placed, and wherein the game object corresponds to a celestial body;
determining, by a shader in a renderer computer program, a light-emission status of the game object in the game virtual space;
acquiring cartesian coordinate information of the game object related to a cartesian coordinate system based on the predetermined plane, wherein the cartesian coordinate information comprises a position of a drawing target of the game object to be displayed in the game virtual space;
converting the cartesian coordinate information into polar coordinate information for the drawing target using a polar coordinate system based on a reference axis, wherein the game object rotates within the game virtual space around the reference axis; and
displaying, using the shader, the drawing target of the game object at the position in the game virtual space based on the polar coordinate information and the light-emission status,
wherein displaying the drawing target comprises controlling a display form of the drawing target in the game virtual space based on a predetermined condition.

8. A game-virtual-space providing device comprising:
a computer processor; and
a memory connected to the computer processor, wherein the memory comprises instructions configured to perform a method comprising:
generating a game virtual space, which is a spherical coordinate space, wherein the game virtual space has a predetermined plane in which a game object is placed, and wherein the game object corresponds to a celestial body;
determining, by a shader in a renderer computer program, a light-emission status of the game object in the game virtual space;
acquiring cartesian coordinate information of the game object related to a cartesian coordinate system based on the predetermined plane, wherein the cartesian coordinate information comprises a position of a drawing target of the game object to be displayed in the game virtual space;
converting the cartesian coordinate information of the drawing target into polar coordinate information for the drawing target using a polar coordinate system based on a reference axis, wherein the game object rotates within the game virtual space around the reference axis; and displaying, using the shader, the drawing target of the game object at the position in the game virtual space based on the polar coordinate information and the light-emission status, wherein displaying the drawing target comprises controlling a display form of the drawing target in the game virtual space based on a predetermined condition.

\* \* \* \* \*